United States Patent [19]

Spiegel et al.

[11] Patent Number: 5,451,249
[45] Date of Patent: Sep. 19, 1995

[54] LANDFILL GAS TREATMENT SYSTEM

[75] Inventors: Ronald J. Spiegel, Chapel Hill, N.C.; Richard A. Sederquist, Newington; John C. Trocciola, Glastonbury; Herbert C. Healy, Hebron; Roger R. Lesieur, Enfield; Gregory J. Sandelli, Newington, all of Conn.

[73] Assignee: International Fuel Cells, South Windsor, Conn.

[21] Appl. No.: 241,113

[22] Filed: Jun. 14, 1994

[51] Int. Cl.$^6$ .................................... B01D 53/04
[52] U.S. Cl. .......................... 95/117; 95/122; 95/136; 95/148; 96/122; 96/127; 96/130; 96/132; 96/133; 96/136; 96/144
[58] Field of Search ................. 96/121, 122, 126, 127, 96/130-137, 142-144, 146; 55/267-269; 95/90, 117-120, 135, 136, 137, 148

[56] References Cited

U.S. PATENT DOCUMENTS

| | | | |
|---|---|---|---|
| 3,086,342 | 4/1963 | Goettl | 96/127 |
| 4,025,324 | 5/1977 | Stackhouse, Jr. et al. | 96/126 X |
| 4,530,817 | 7/1985 | Hölter et al. | 96/130 X |
| 4,655,049 | 4/1987 | Andrews et al. | 96/135 X |
| 4,846,852 | 7/1989 | Schweitzer et al. | 96/122 X |
| 4,881,953 | 11/1989 | Prasad et al. | 96/130 X |
| 4,986,836 | 1/1991 | Tandon | 96/127 X |
| 5,059,405 | 10/1991 | Watson et al. | 423/210 |
| 5,176,798 | 1/1993 | Rodden | 96/127 X |
| 5,313,781 | 5/1994 | Toda et al. | 96/130 X |

FOREIGN PATENT DOCUMENTS 2214663  10/1973  Germany .......................... 96/130

OTHER PUBLICATIONS

Schilling, et al., Conception of New Absorption Process for Purifying Landfill Gas for the Kapiteltal Landfill Site West Germany, Chapt. 5, "New Directions in Sorption Technology".

Rantenback et al; Treatment of Landfill Gas by Gas Permeation Pilot Plant Results and Comparison with Alternative Uses, pp. 31–37, "Gas Separation and Purification", 1993, vol.7, No.1.

Primary Examiner—Robert Spitzer
Attorney, Agent, or Firm—William W. Jones

[57] ABSTRACT

The gas stream which emanates from landfills is treated to produce a purified gas which is essentially a hydrocarbon such as methane which can be used as the fuel source in a fuel cell power plant, or can be used in other power plants which use natural gas as a fuel. The landfill gas passes through a system which removes essentially all of the hydrogen sulfide; water; organic sulfur and halogen compounds; and solid contaminants from the gas stream. The resultant purified gas stream can be cleanly flared; used to power an energy plant; or put to other useful purposes.

14 Claims, 3 Drawing Sheets

LANDFILL GAS TREATMENT SYSTEM

This invention was made with Government support under EPA contract 68-D1-0008 awarded by the Environmental Protection Agency, Research Triangle Park, N.C. The Government has certain rights in this invention.

TECHNICAL FIELD

This invention relates to a system for treating landfill gas to purify the same and render it cleanly combustible. More particularly, this invention relates to a landfill gas treatment system which can render the landfill gas usable as a hydrogen source for a fuel cell power plant.

BACKGROUND ART

Man-made landfills are the source of gases which emanate therefrom and pass into the atmosphere. These gases are commonly referred to as "landfill" gases. The major components of landfill gas are methane, carbon dioxide and nitrogen. There are also minor amounts of oxygen, other organic compounds, halides and hydrogen sulfide. Landfill gases which present a potential energy source, presently constitute little more than a nuisance and a potential environmental hazard, and are believed by many scientists to contribute to the greenhouse effect. At present, landfill gas is dealt with by venting to the atmosphere; burning in boilers; flaring; fueling internal combustion engine-driven generators; or as a natural gas substitute after the $CO_2$ is removed therefrom.

Landfill gas is seen to be a potential source of carbon dioxide, and also as a potential source of natural gas. U.S. Pat. No. 5,059,405 granted Oct. 22, 1991 to R. J. Watson, et al. discloses a process for purification of landfill gas to recover carbon dioxide therefrom. The process described therein involves the removal of impurities such as sulfur compounds, halogens, water, and the like. After removal of the aforesaid impurities, the remaining gas is incinerated in a boiler/incinerator combustion furnace to produce an exit stream of essentially pure carbon dioxide. In this process, the combustible methane component of the landfill gas is simply incinerated.

An article published in the March, 1993 issue of Gas Separation and Purification (Vol. 7, No. 1), pages 31-37 by R. Rautenbach, et al. describes the treatment of landfill gas by converting $H_2S$ to sulfur in a burner. The sulfur is then transported to a bed of carbon wherein the sulfur is deposited. A problem attendant to this system is that the sulfur can deposit in the transfer lines and can cause a pressure drop in the system to increase. The water in the system is removed by a refrigerator. Halogen compounds are adsorbed on carbon. The carbon is regenerated by steam which results in an environmentally polluting aqueous mixture of water and halogen.

DISCLOSURE OF THE INVENTION

This invention relates to a system for removing chemical contaminants from landfill gas to produce a natural gas-quality fuel gas that is suitable for use as a fuel source in a fuel cell power plant, or for other energy generating applications. The landfill gas is collected from the landfill by drilling gas collection wells in the landfill, and pumping the landfill gas from the wells into a collection pipeline which leads to the treatment system of this invention. The collected landfill gas is fed into a hydrogen sulfide adsorber which may be an activated carbon bed, zinc oxide, or carbon impregnated with potassium hydroxide or potassium carbonate. This step removes the hydrogen sulfide by means of the following chemical reaction:

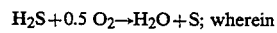

$H_2S + 0.5\ O_2 \rightarrow H_2O + S$; wherein the sulfur produced is adsorbed onto the adsorbent bed. The desulfurized gas stream is then fed into a heat exchanger/condenser station wherein water vapor and some hydrocarbons are condensed and removed from the gas stream. The gas stream is then fed through a dehydration adsorption bed/molecular sieve station wherein water vapor and organic sulfur and organic halogen compounds are removed from the gas stream. The gas stream is then passed through a second heat exchange station and thence to a hydrocarbon adsorption bed of activated carbon wherein the remaining contaminant hydrocarbon compounds are removed by adsorption. The gas stream is then passed through a particulate filter which removes any remaining solid particles from the gas stream. The final stage in the system is an ambient air heat exchanger station wherein the contaminant cleaned gases are warmed to a temperature of about 50° F. in preparation for entry into a fuel cell power plant. The gas stream thus produced will be fed to a conventional fuel cell power plant, where the clean landfill gas will ultimately be processed in a steam reformer to provide hydrogen to a fuel cell for generating electrical power. A portion of the clean landfill gas provided by the system will be returned to the system for regenerating the dehydration and hydrocarbon adsorption beds. As will be noted in the ensuing description of the invention, certain of the above-enumerated stations may be eliminated in certain cases.

It is therefore an object of this invention to provide a landfill gas treatment system operable to purify landfill gas to the extent needed to substitute the purified landfill gas for natural gas as a clean energy source.

It is a further object of this invention to provide a landfill gas treatment system of the character described wherein the purified gas is suitable for use as a fuel source in a fuel cell power plant.

It is another object of this invention to provide a landfill gas treatment system of the character described which is environmentally compatible.

These and other objects and advantages of this invention will become more readily apparent from the following detailed description of several embodiments of this invention when taken in conjunction with the accompanying drawings, in which:

BEST MODE FOR CARRYING OUT THIS INVENTION

Figure 1:
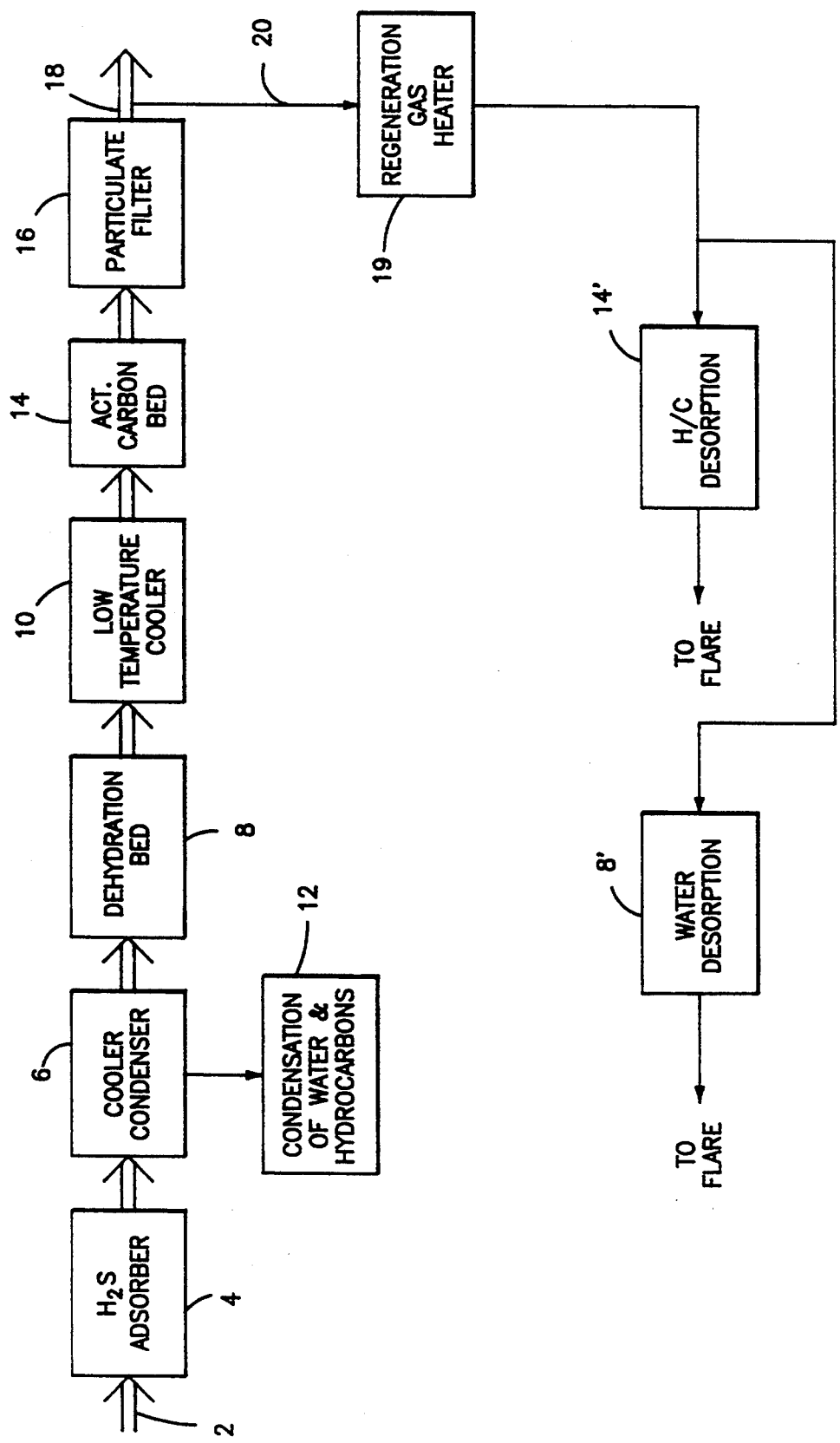
FIG. 1 is a schematic drawing of one embodiment of a landfill gas treatment facility formed in accordance with this invention.

Referring now to FIG. 1, there is shown a first embodiment of a landfill gas treatment system or facility that is capable of converting a landfill gas stream to a gas stream that can be used to provide a hydrogen fuel gas source for a fuel cell power plant. The gas treatment system includes a landfill gas inlet line 2 which passes a stream of raw landfill gas from the landfill into a hydrogen sulfide-adsorption station 4. The nominal primary components (and their concentrations) of the raw landfill gas are: methane (54%); carbon dioxide (40%); nitrogen (4%); oxygen (1%); water vapor (1%); plus trace, but significant amounts of hydrogen sulfide; and hydrocarbons including sulfur containing and halogenated hydrocarbons. The station 4 is a packed adsorption bed which may include as adsorption materials zinc oxide, activated carbon, or carbon impregnated with various compounds, such as potassium hydroxide to increase sulfur adsorption capacity and enhance the conversion of $H_2S$ into sulfur. The adsorption bed is not regenerable on site, and must be removed to another site for either regeneration or disposal. It is essential that the hydrogen sulfide be removed from the gas stream at the first treatment station so as not to produce COS later in the gas treatment process, since significant quantities of COS (carbonyl sulfide) are not compatible with fuel cell power plant chemistry, and will poison the fuel gas reformer catalysts in the power plant.

The essentially hydrogen sulfide-free gas stream is then fed into a first stage cooler condenser station 6 which operates at a temperature which is slightly above the freezing point of water, preferably about 33° to 35° F. The first stage cooler condenser station 6 serves to condense the water vapor and some of the heavier hydrocarbon fractions out of the gas stream and into a condensation station 12. The cooler condenser station 6 is preferably a conventional shell and tube heat exchanger. The gas stream with condensed water and hydrocarbon fractions is then passed through a water adsorption desiccant dehydration station 8 consisting of activated alumina or a three angstrom molecular sieve material, or a combination of both wherein the condensed water fraction is adsorbed from the gas stream by flowing through a dehydration bed which reduces the dew point of the gas stream to significantly below the freezing point of water.

The essentially dry gas stream then passes into a second stage cooler station 10 which is also a shell and tube heat exchanger, and which operates at a temperature below the freezing point of water, preferably in range of about 0° F. to about $-20°$ F.

The gas stream is then transferred to a subsequent activated carbon adsorption bed station 14. The second adsorption bed station 14 is operative to adsorb any hydrocarbon contaminants which were not eliminated by the dehydration bed 8. The adsorption station 14 is conservatively sized to remove all heavy hydrocarbon and halogen contaminant fractions in the inlet landfill gas. The gas stream is then fed through a particulate filter station 16 wherein contaminant particles such as attrited dehydration bed or activated carbon media are removed from the gas stream. The purified gas stream then can be fed into a fuel cell power plant through line 18 wherein it can be reformed and used as a hydrogen source for the power plant. Prior to entering the line 18, the gas stream is heated indirectly by a finned ambient air-heated heat exchanger to a temperature suitable for operation of a fuel cell.

The system is preferably run with a dehydration/desiccant bed 8 and the activated carbon, adsorption bed 14 operating with parallel stations 8' and 14' one of which will be in operation while the other is being regenerated. Each of the stations 8 and 14 are regenerated by heated regeneration gas from gas heater 19 which heater 19 utilizes part of the purified landfill gas product which flows through line 20 to desorb beds 14' and 8' respectively. The effluent gases from the beds 8' and 14' are incinerated in a flare. The regeneration gas stream 20 represents about 10% to 30% of the clean landfill gas produced by the system.

Figure 2:
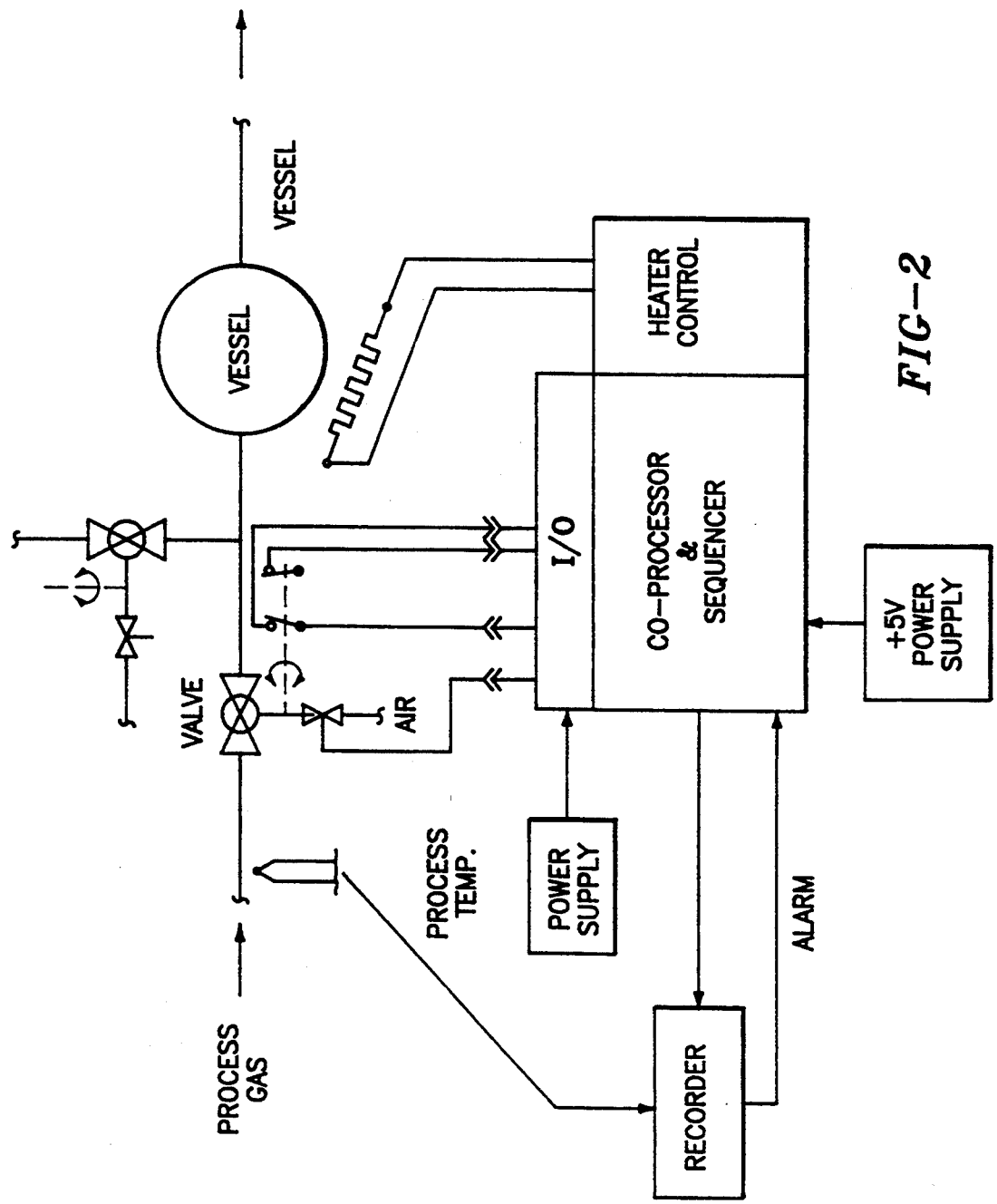
FIG. 2 is a control schematic drawing of the mode of operation of the system controller software.

Referring now to FIG. 2, the mode of operation of the system controller software which controls operation of the system is shown. FIG. 2 shows that the system is managed by a dedicated co-processor. The co-processor software uses a common architecture to support memory management, program I/O execution and basic housekeeping tasks such as display and alarm processing.

The software I/O controls valves and heaters in parallel gas flow paths to achieve raw landfill gas adsorption and media regeneration. At discrete time intervals, the flow paths are exchanged to maintain continuous through-put. Valve position, heater control, regeneration flow and liquid level control are continuously monitored. Automatic fault handling and alarm processing for improper valve position, low regeneration flow or exceeding thermal limits from field devices, will safely shut the process down. Restart of the process will always be from the point of shutdown.

The non-reversible valve sequencing logic is programmed for 19 independently-timed steps. By establishing dual flow paths, simultaneous adsorption and regeneration takes place. Through intrinsically safe optically coupled I/O, the timed programmed steps sequence the opening and closing of valves to alternately cycle the parallel paths. During the transition steps the logic controls additional valves to achieve system pressure balance between adsorption and regeneration.

At a predetermined process step, a reset pulse generator resets and the process repeats.

An important factor in the process is maintenance of correct gas flow paths. To insure proper gas flow, valve positions are continuously monitored.

Monitoring of the process valves following each program step verifies correct valve position, and enables process continuation.

Controlled heating is desirable for the regeneration cycle. The software interlocks ensure that the heaters are off during the adsorption cycle.

Incorrect valve position; loss of flare flame; or a recorder limit alarm will initiate a process shutdown. Retention coils embedded in the software retain the program state through STOP-TO-RUN transitions and power failures. This insures restart will always be from the point of shutdown and guarantees full adsorption/regeneration cycles.

Figure 3:
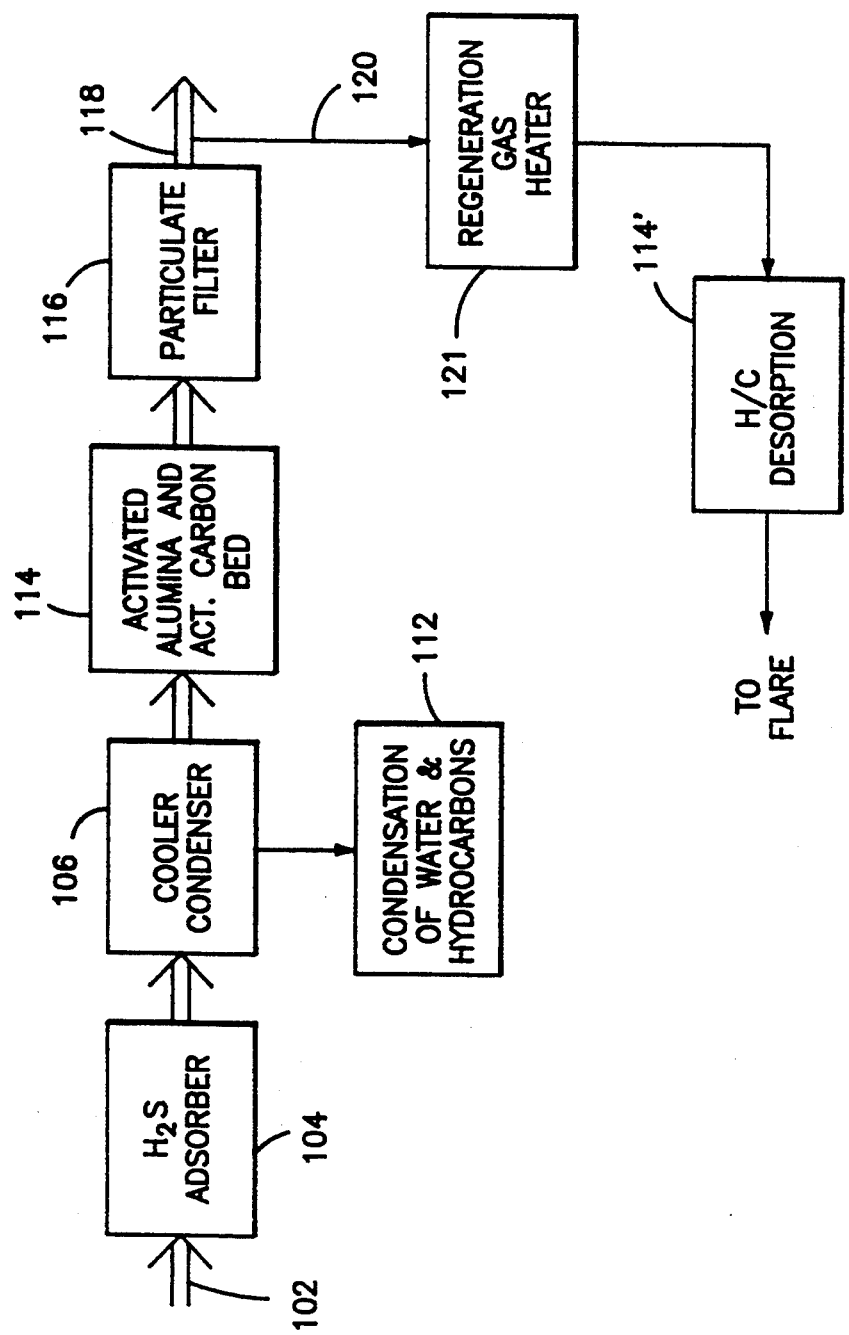
FIG. 3 is a schematic drawing of another simplified embodiment of a landfill gas treatment facility formed in accordance with this invention.

Referring now to FIG. 3, a simplified embodiment of the system is shown which may be utilized depending on the level of contaminants in the landfill gas. The simplified system includes a landfill gas inlet line 102; a hydrogen sulfide adsorption station 104; a cooler condenser station 106 with an associated condensation station 112; a compound adsorption bed 114 of alumina and/or a molecular sieve followed by activated carbon to remove both water and hydrocarbon contaminants from the gas stream to produce a dry, sulfur and halogen-free gas which flows through a particulate filter 116 to the line 118 leading to the power plant. The simplified system, although employing a final activated carbon bed operating at 33° to 35° F. inlet temperatures, rather than 0° to −20° F. may provide adequate protection for lower contaminant-containing landfill gas. The adsorption bed 114 can be run in parallel with a similar bed 114' with one bed 114 or 114' being desorbed and regenerated by heated regeneration gas from line 120 and regeneration gas heater 121, while the other operates to cleanse the gas entering the power plant.

It will be readily appreciated that the system of this invention is formed from commercially available individual components which, when combined as described above, will convert landfill gas to a usable natural gas which can be used as the fuel source for an acid or other fuel cell power plant; or can be used for other useful purposes where natural gas may be utilized. The system may be erected on the landfill site and combined with a power plant on the site. Adsorption beds which are included in the system may be regenerated on site by heated gases obtained from the outlet of the landfill gas treatment system. The system thus converts a landfill effluent which is presently deemed to be at best a nuisance into a useful product in an environmentally compatible manner.

Since many changes and variations of the disclosed embodiments of the invention may be made without departing from the inventive concept, it is not intended to limit the invention otherwise than as required by the appended claims.

What is claimed is:

1. A method for treating a raw landfill gas stream to form a treated methane-based gas which may be used in lieu of natural gas as a fuel gas, said method comprising the steps of:
    a) passing said landfill gas stream through a hydrogen sulfide adsorption bed to reduce hydrogen sulfide content of the raw landfill gas stream to about five ppm or less;
    b) cooling a resultant gas stream emanating from said adsorption bed to a temperature which is operable to condense water vapor and heavier hydrocarbon fractions in the resultant gas stream;
    c) adsorbing condensed water vapor and heavier hydrocarbon fractions from the resultant gas stream to form a dried gas stream;
    d) removing hydrocarbon contaminants from the dried gas stream by passing the dried gas stream through an activated carbon bed; and
    e) removing contaminant particules from the dried gas stream.

2. The system of claim 1 comprising the step of removing a condensed water fraction from the resultant gas stream, and reducing the dew point of the resultant gas stream to a temperature which is below the freezing point of water.

3. The method of claim 2 wherein said removing and reducing step is performed by passing the resultant gas stream through an activated alumina and/or molecular sieve component in which the condensed water fraction is adsorbed from the resultant gas stream.

4. The method of claim 2 wherein said resultant gas stream is cooled to a temperature in the range of about 0° F. to about minus 20° F.

5. A system for treating a raw landfill gas stream to form a treated methane-based gas which may be used in lieu of natural gas as a fuel gas, said system comprising:
    a) a hydrogen sulfide adsorption bed for receiving the raw landfill gas stream, said hydrogen sulfide adsorption bed being operable to reduce hydrogen sulfide content of the landfill gas stream to about five ppm or less;
    b) a cooler condenser adsorption bed station for receiving an essentially hydrogen sulfide-free gas stream and cooling said hydrogen sulfide-free gas stream to a temperature which is operable to condense and adsorb water vapor and heavier hydrocarbon fractions from the gas stream;
    c) an activated carbon bed for receiving an essentially dry gas stream from the cooler condenser adsorption bed station, said carbon bed being operable to remove hydrocarbon contaminants from the gas stream;
    d) a particulate filter station for removing contaminant particles from the gas stream; and
    e) a gas stream line for transferring the treated gas to a fuel-consumption device which can produce environmentally-clean energy from the treated gas.

6. The system of claim 5 further comprising a parallel hydrocarbon adsorption and removal station for the raw landfill gas stream; and a line for directing a regeneration portion of the treated gas through said parallel hydrocarbon adsorption and removal station to regenerate activated carbon in said parallel hydrocarbon adsorption and removal station.

7. The system of claim 6 further comprising a combustion station operable to flare a gas stream emitted from said parallel hydrocarbon adsorption and removal station.

8. The system of claim 6 further comprising a parallel dehydration station which provides a second condensed water removal station for the raw landfill gas stream; and a line for directing said regeneration portion of the treatment gas stream through said parallel dehydration station to regenerate said second condensed water removal station for further gas stream water removal.

9. The system of claim 8 further comprising a combustion station operable to flare a gas stream emitted from said parallel dehydration station.

10. The system of claim 8 further comprising a heater which heats regeneration gas provided to said parallel hydrocarbon adsorption and removal station, and to said parallel dehydration station.

11. The system of claim 5 further comprising a dehydration station operable to remove a condensed water fraction from the gas stream, and to reduce the dew point of the gas stream to a temperature which is below the freezing point of water.

12. The system of claim 11 wherein said dehydration station consists of an activated alumina and/or molecular sieve component in which the condensed water fraction is adsorbed from the gas stream.

13. The system of claim 12 further comprising a cooler station which is adjacent to said dehydration station and through which the gas stream passes, said cooler station operating at a temperature below the freezing point of water.

14. The system of claim 13 wherein said cooler station operates at a temperature in the range of about 0° F. to about minus 20° F.

* * * * *